United States Patent
Deboy et al.

(10) Patent No.: US 11,630,747 B1
(45) Date of Patent: Apr. 18, 2023

(54) TECHNIQUES FOR AUTOMATED SERVICE MONITORING AND REMEDIATION IN A DISTRIBUTED COMPUTING SYSTEM

(71) Applicant: Oracle International Corporation, Redwood Shores, CA (US)

(72) Inventors: Scott Alan Deboy, Portland, OR (US); David Fernando Saes, Austin, TX (US); Naveen Pilli, Milton (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/561,703

(22) Filed: Dec. 23, 2021

(51) Int. Cl.
  *G06F 11/00* (2006.01)
  *G06F 11/30* (2006.01)
  *G06F 9/445* (2018.01)
  *G06F 11/07* (2006.01)
  *G06F 11/34* (2006.01)

(52) U.S. Cl.
  CPC ...... *G06F 11/3006* (2013.01); *G06F 9/44526* (2013.01); *G06F 11/0793* (2013.01); *G06F 11/3409* (2013.01)

(58) Field of Classification Search
  CPC ............ G06F 11/3006; G06F 11/0793; G06F 11/3409; G06F 11/3093; G06F 11/309; G06F 11/0712; G06F 11/301
  See application file for complete search history.

(56) References Cited

U.S. PATENT DOCUMENTS

2016/0092204 A1* 3/2016 Katkere .................... G06F 8/71
  717/170
2017/0118284 A1* 4/2017 Chen ...................... H04L 41/20

* cited by examiner

*Primary Examiner* — Katherine Lin
(74) *Attorney, Agent, or Firm* — Kilpatrick Townsend & Stockton LLP

(57) ABSTRACT

Techniques are disclosed to provide automated remediation of services within a distributed computing system. A remediation module may be executed in the distributed computing system to monitor one or more services. Each service can have a corresponding monitor plugin that is loaded into the remediation module and configured to allow the remediation module to interface with the services. The monitor plugin may specify the dependencies of its corresponding service and remediation tasks to be performed on the service if it fails. The remediation module may generate a dependency tree for the services using the specified dependencies from each monitor plugin. The remediation module may query a service to obtain the service's health status, and then use the dependency tree to determine whether upstream services on which the unhealthy service depends are also unhealthy. If the upstream services are healthy, the remediation module may automatically perform remediation tasks on the service.

20 Claims, 11 Drawing Sheets

```
400 ─┐
         404 ─┐
              ▼
enum RemediationMetricValue {
        NOT_APPLICABLE                          (0, "NOT_APPLICABLE"),
        DEPENDENCIES_NOT_CHECKED                (5, "DEPENDENCIES_NOT_CHECKED"),
        DEPENDENCIES_UNHEALTHY                  (10, "DEPENDENCIES_UNHEALTHY"),
        ...
        MANUAL_REMEDIATION_REQUIRED             (20, "MANUAL_REMEDIATION_REQUIRED"),
        AUTOMATED_REMEDIATION_APPROVAL_REQUESTED
                                                (25, "AUTOMATED_REMEDIATION_APPROVAL_REQUESTED"),
        AUTOMATED_REMEDIATION_INITIATED         (30, "AUTOMATED_REMEDIATION_INITIATED"),
        AUTOMATED_REMEDIATION_IN_PROGRESS       (35, "AUTOMATED_REMEDIATION_IN_PROGRESS"),
        ...
        COMPONENT_HEALTH_POOR                   (50, "COMPONENT_HEALTH_POOR"),
        COMPONENT_HEALTH_VERY_POOR              (55, "COMPONENT_HEALTH_VERY_POOR"),
        COMPONENT_HEALTH_CRITICAL               (60, "COMPONENT_HEALTH_CRITICAL")
        COMPONENT_HEALTHY                       (100, "COMPONENT_HEALTHY")}

TECHNIQUES FOR AUTOMATED SERVICE MONITORING AND REMEDIATION IN A DISTRIBUTED COMPUTING SYSTEM

BACKGROUND

Cloud-based services provide various functionality within a cloud computing environment, including compute, storage, networking, and multiple other critical services such as identity management. The services may be monitored to evaluate and maintain their functionality, including ensuring continued availability, recovering from failures, and deploying updates. Some monitoring and remediation tasks can be automated, while others may involve human intervention. Because cloud-based services may depend on other services in complicated ways, automated remediation that can account for the service dependencies is desirable.

BRIEF SUMMARY

Embodiments of the present disclosure relate to providing automated monitoring and remediation of cloud-based services. More particularly, some embodiments provide methods, computer-readable media, and systems that implement a remediation module in a distributed computing system that can monitor the health of a plurality of services, evaluate the dependencies of each service on other services, and perform remediation tasks on a service that is determined to be "unhealthy." The monitoring may be accomplished with the use of a plurality of monitor plugins loaded by (e.g., executed in conjunction with) the remediation module. Each monitor plugin can correspond to a service hosted within the distributed computing system and can specify the dependencies of the service, the monitoring interval (e.g., the time between service health checks), and remediation tasks to be performed by the remediation module in response to the remediation module determining that the service is unhealthy.

Remediation tasks can include providing alarms, alerts, or other indications of the service health status to a monitoring system (e.g., a computer system used by operations personnel to monitor deployed services). Remediation tasks can also include applying software patches to the service or service components, restarting the service, and deploying additional infrastructure to support the service. Remediation tasks can also include manual intervention (e.g., replacing a failed hardware component in a data center). Because a service may lose functionality due to a loss of functionality with a service on which it depends, the remediation module may evaluate the dependencies of the service before performing remediation tasks.

One embodiment is directed to a method performed by a distributed computing system hosting a plurality of services, including a first service and a second service. The method can include executing a remediation module, a first monitor plugin, and a second monitor plugin. The first monitor plugin may be configured to interface with the remediation module (e.g., by connecting with a plugin interface of the remediation module). The first monitor plugin may correspond to a first service hosted by the distributed computing system and can include dependency information for the first service. Similarly, the second monitor plugin can correspond to a second service hosted within the distributed computing system. The second monitor plugin may also be configured to interface with the remediation module. The method may also include generating a dependency tree that can specify a dependency of the first service on the second service. The remediation module may use the dependency information included in the first monitor plugin to generate the dependency tree. The method can also include obtaining a first health metric from the first service via the first monitor plugin and obtaining a second health metric from the second service via the second monitor plugin. The method can also include determining whether the first service is unhealthy based on the first health metric, determining that the second service is healthy based on the second health metric, and performing a remediation task for the first service if the first service is unhealthy and the second service is healthy.

In some embodiments, the method can also include executing a third monitor plugin corresponding to a third service hosted in the distributed computing system. When the third monitor plugin is loaded into the remediation module, the remediation module can generate an updated dependency tree based on additional dependency information included in the third monitor plugin.

In some embodiments, the method can also include, storing, in accordance with another determination that the second service is unhealthy, remediation information that includes the first health metric, the second health metric, and/or the dependency of the first service on the second service.

In some embodiments, the method may also include identifying, using a system inventory, one or more hosts of the first service, establishing a connection with the hosts, and executing a command to query the first health metric from the first service. In some embodiments, the remediation module can update the system inventory in response to identifying a change to the configuration of the one or more hosts.

In some embodiments, the remediation task can include generating an alert that includes the first health metric. The remediation module may send the alert to a monitoring system. The remediation task may be restarting the first service automatically (without human intervention). The remediation task may also include updating the first service according to a patch. some embodiments, the remediation task can also include sending an approval request to a monitoring system, receiving an indication that the approval request was approved, and then performing the remediation task (e.g., restarting the service, provisioning additional computing resources for the service, etc.).

Another embodiment is directed to a distributed computing system configured with one or more processors and one or more memories storing computer-executable instructions that, when executed by the one or more processors, cause the cloud-computing edge device to perform the method described in the preceding paragraphs.

Still another embodiment is directed to a non-transitory computer-readable medium storing computer-executable instructions that, when executed by one or more processors of a cloud-computing edge device, cause the cloud-computing edge device to perform the methods disclosed herein.

BRIEF DESCRIPTION OF THE DRAWINGS

FIG. 4 is a snippet of code representing health metrics of services monitored by a remediation module, according to some embodiments.

DETAILED DESCRIPTION

Figure 1:
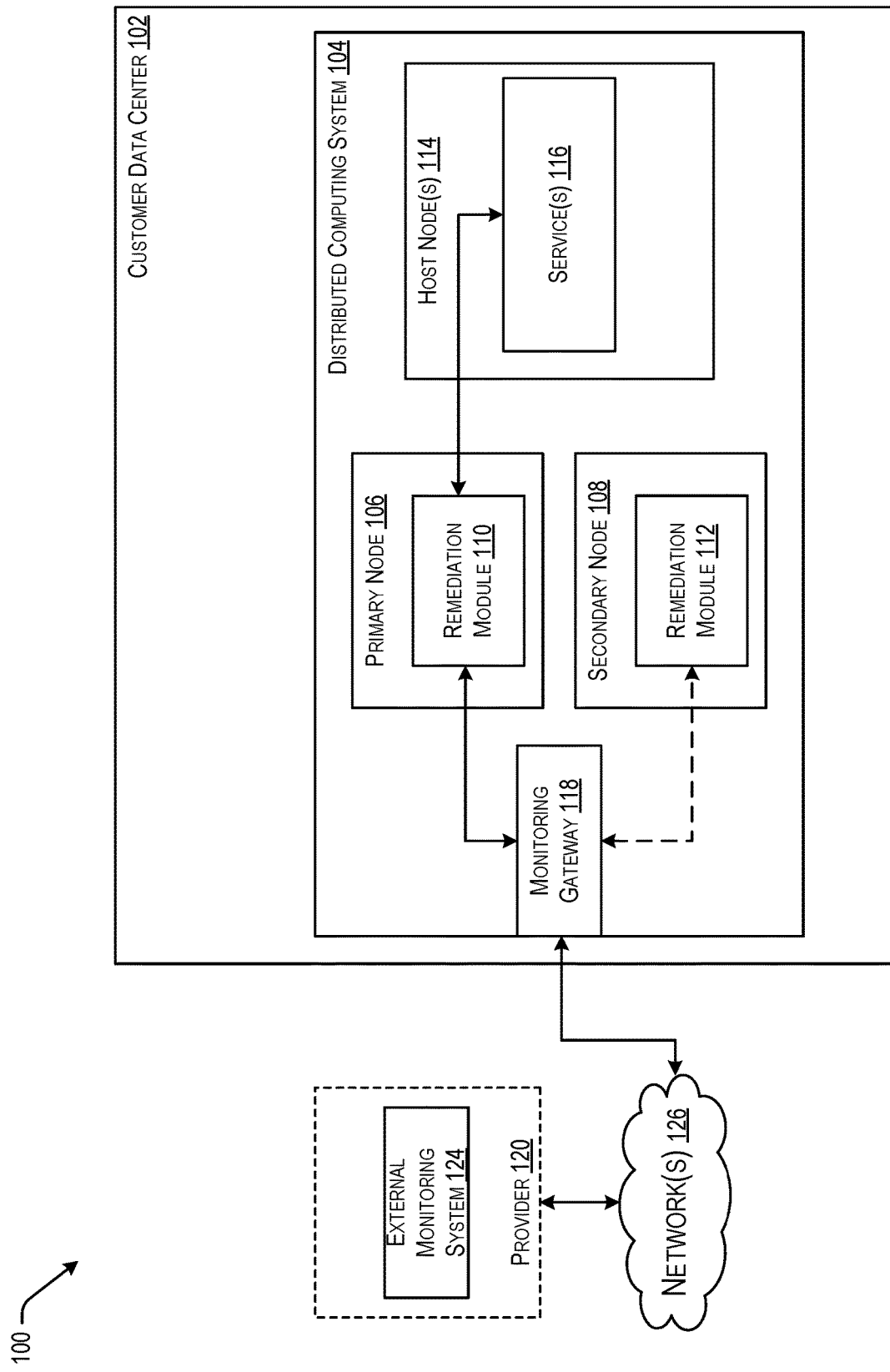
FIG. 1 depicts a distributed computing system implemented at a customer data center and hosting an automated remediation module, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. Any embodiment or design described herein as "exemplary" or an example is not necessarily to be construed as preferred or advantageous over other embodiments or designs.

Distributed computing systems, including cloud-based platforms and other cloud computing systems, are increasingly relied on to provide computing services to customers. Often, these distributed computing systems are provided by cloud services providers, including cloud computing infrastructure providers, over a public network (e.g., the Internet), with the bare-metal computing resources hosted within facilities operated by the cloud services provider. In some instances, however, customers may operate computing facilities (e.g., data centers) and/or provide physical computing resources (e.g., processors, memory, storage drives, networking hardware, etc.) for a distributed computing system and rely on a cloud services provider to deploy, monitor, and support various cloud services on the customer's physical resources. Such configurations may provide customers with similar functionality to cloud services delivered over a public network while allowing the customer to control the data, access to the data, and security of the data and computing resources.

Shifting the physical resources from the cloud services provider to the customer presents some difficulties in deploying cloud services that function in the same manner as a traditional cloud deployment. A cloud services provider may monitor deployed services (e.g., compute services, storage services, identity management services, etc.) and provide remediation to services that suffer degraded performance or fail. Monitoring services can include checking and evaluating the health (e.g., functionality) of a service and providing alerts, alarms, support tickets, and other signals regarding the service health, while remediation can include restarting services, patching service software, deploying additional infrastructure resources to support a service, and the like. Deployed services may also depend on other deployed services, resulting in failures of upstream services impacting the health of dependent services.

Many remediation tasks may be automated (e.g., by scripts), while some may rely on manual intervention (e.g., operator implementing a particular software fix, operator fixing hardware at a facility, etc.) or manual approval (e.g., operator reviews and approves proposed remediation). Because the physical resources are with the customer, cloud service provider personnel (e.g., operations personnel) may have more limited access to the deployed services to implement remediation. Thus, increasing automated remediation is highly desirable. In addition, remediation that can identify the dependencies of services to pinpoint whether upstream services are the root cause of the failure may further improve the effectiveness of automated remediation.

According to some embodiments, a distributed computing system can implement a remediation module that includes a plurality of monitor plugins (e.g., software components executed with the remediation module). Each monitor plugin can correspond to a service hosted by the distributed computing system. A monitor plugin can specify dependencies of the service (e.g., identify services and other resources that the service may need to function properly), identify how to check and/or evaluate the health of the service (e.g., identify a script or other software used to query the service's health), specify a monitoring interval (e.g., how often to run a script to query the service's health), and specify remediation tasks to perform in response to various health conditions (e.g., identify a script to perform a remediation task).

To monitor the services, the remediation module can obtain, using the monitor plugins, health metrics for the services. The health metrics can correspond to states of the services (e.g., "unhealthy," "dependency unhealthy," "remediation in progress," etc.) and/or states of components of the services (e.g., "component unhealthy," "component healthy," etc.). The health metrics can be persisted in a data store (e.g., database, storage, file, etc.) to be retrieved and/or checked by the remediation module at a later time. For example, the monitor plugins may specify that the health metrics for the services be obtained at a particular interval. If the remediation module performs a check of the dependencies of a service, it can check the stored health metrics to determine the current state of the services.

The dependencies of the various services may be represented by a dependency tree. The remediation module may generate a dependency tree base on the dependency information from each monitor plugin it loads. The dependency tree can include the dependencies of all the services monitored by the remediation module. If a new service is deployed, the remediation module can load a new plugin corresponding to the new service and generate an updated dependency tree that includes any additional dependencies of the new service. The remediation module can use the dependency tree when performing dependency checks for the services.

If a service is unhealthy (e.g., has a health metric associated with a degraded state of the service), the remediation module can, in some embodiments, automatically remediate (e.g., perform a remediation task) the service. Before performing remediation, the remediation module can check (e.g., retrieve stored health metrics or run a health check at the service) the health of all dependencies (that is to say, upstream services). If the dependency services are also unhealthy (e.g., have a health metric associated with a degraded state), the remediation on the first service may not be performed. The first service may actually be healthy but for its dependency on a failed upstream service. If the dependency services are healthy (e.g., have a health metric associated with a fully-functional state), then the remediation module may perform the remediation.

In some embodiments, remediation can include automated tasks initiated by the remediation module and potentially executed in conjunction with one or more other services or components of the distributed computing system. For example, a cloud services provider may provide a monitoring system and/or management system (e.g., a computing system external to the distributed computing system) configured to execute remediation workflows (e.g., deploy patches, restart and/or reconfigure a failed service, etc.). The automated remediation tasks may also be executed by the distributed computing system (e.g., by a control plane of the distributed computing system).

In other embodiments, remediation can include automated tasks that may need approval (e.g., review by a human operator) and/or manual tasks. As part of performing a remediation task, the remediation module can provide an alarm, alert, or other similar indication to a monitoring system (e.g., an operator console) that indicates that a manual remediation may be performed for the unhealthy service. In addition, for remediation tasks that may need approval, the remediation module can send an approval request to the monitoring system. Upon receiving an indication that the request is approved, the remediation module can perform the remediation task automatically.

Implementing automated remediation and service monitoring with robust dependency evaluation provides numerous advantages. Conventional techniques are limited in that, while services are aware of their own dependencies, a monitoring system may not. A conventional monitoring system may then receive alerts and emit alarms to operations personnel for every service (and every associated service component, e.g., host nodes, host virtual machines, etc.) that indicates a failure, even though only one service has truly failed (e.g., a root cause) and the others are simply indicating a degraded status due to their dependency on the failed service. Because alarms and alerts corresponding to a service may be evaluated by personnel responsible for maintaining that service (and potentially not responsible for maintaining the other services), such naïve alarms can hinder the detection and remediation of the root cause failure. In monitoring systems that implement automated remediation, the monitoring system may expend excess computing resources to perform unnecessary remediation, causing delays and potentially additional cascading failures when otherwise healthy services are taken offline to implement the fix.

By contrast, techniques described herein provide robust dependency evaluation that can identify whether an upstream service is also unhealthy prior to performing remediation on a dependent service. If the upstream service is unhealthy, remediation for the dependent service may not occur until the upstream service issue is resolved. In this way, the system can avoid apply unnecessary remediation to a service. The dependency evaluation may be implemented intelligently by allowing the monitor plugins to specify multiple levels of dependencies for the corresponding service, including dependencies for hosts (e.g., host virtual machines) or other hardware and software components responsible for running the service. In doing so, the dependency of a service on other services can be fine-tuned, allowing a more detailed evaluation of the services monitored by a remediation module. Additionally, spurious alarms are greatly reduced. Alarms and alerts may then be limited to the root cause unhealthy service, resulting in faster response times and faster mitigation of the service degradation.

Turning now to the figures, FIG. 1 depicts a computing environment 100 including a distributed computing system 104 implemented at a customer data center 102 and providing automated remediation, according to some embodiments. The customer data center 102 may host any suitable number of physical computing systems and associated hardware, including computers (e.g., computer racks, server racks, etc.), storage systems, networking hardware (e.g., switches, gateways, etc.), and the like. The distributed computing system 104 may be implemented by one or more computing systems within the customer data center that execute computer-readable instructions (e.g., code, program) to implement the distributed computing system. T distributed computing system may include a computing cluster of connected nodes (e.g., computers, servers, virtual machines, etc.) that work together in a coordinated manner to perform various operations (e.g., compute, storage, monitoring). As used herein, a "computing node" (also referred to as a "node") may include a server, a computing device, a virtual machine, or any suitable physical or virtual computing resource configured to perform operations as part of the distributed computing system 104. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 104 may be implemented in various different configurations. In the embodiment shown in FIG. 1, the distributed computing system 104 may be implemented on one or more servers of the customer data center 102. The computing environment 100 comprising the distributed computing system 104 depicted in FIG. 1 is merely an example and is not intended to unduly limit the scope of claimed embodiments. One of ordinary skill in the art would recognize many possible variations, alternatives, and modifications. For example, in some implementations, the distributed computing system 104 can be implemented using more or fewer systems than those shown in FIG. 1, may combine two or more systems, or may have a different configuration or arrangement of systems.

The distributed computing system 104 may include nodes for hosting a remediation module, including primary node 106 and secondary node 108. Hosting a primary and secondary instance of remediation modules 110 and 112 can provide high availability of the remediation service in the event of a failure in primary node 106, so that the distributed computing system 104 can fail over to remediation module 112 to continue providing the monitoring and remediation functionality. Remediation module 112 may not actively monitor service(s) 116 when remediation module 110 is performing monitoring to avoid duplicated metrics and/or duplicated remediations as well as to avoid unnecessary load on the service(s) 116.

The distributed computing system 104 can also include host node(s) 114 suitable for hosting one or more service(s) 116. The host node(s) 114 can be any suitable number of computing devices for executing software, code, or other instructions to perform operations corresponding to hosting services, applications, or other software. The host node(s) 114 may include one or more virtual machines (VMs), one or more physical computers, or any suitable combination or arrangement of these or similar devices configured to host the service(s) 116. A service may be implemented across multiple hosts (e.g., multiple instances of the service on different host nodes, a distributed service, etc.).

As described briefly above, a cloud computing system, including distributed computing system 104, may provide numerous service(s) 116, including compute services (e.g., computational capacity), storage services (e.g., access, configuration, and management of various data stores, object storage, block storage, and the like), identity services (e.g., user access management, single sign-on, etc.), secrets services (e.g., provisioning and management of cryptographic keys and similar security features), workflow services (e.g., creating and executing workflow tasks, including control plane tasks, etc.), credential storage services (e.g., storing and retrieving user credentials, passwords, identifiers, and the like), and the like.

In some examples, the service(s) 116 may be implemented as one or more containers (e.g., Docker containers) configured and managed using a containerization engine (e.g., Docker, Kubernetes, etc.). A containerization engine may be a container-orchestration system for automating computer application deployment, scaling, and management, including providing OS-level virtualization to deliver software in packages called containers. These containers can be isolated from one another and utilize respective software, libraries, and configuration files, and can communicate with each other through well-defined channels. In some examples, the remediation modules 110 and 112 may also be implemented as containers within primary node 106 and secondary node 108, respectively.

The distributed computing system 104 may also include monitoring gateway 118, according to certain embodiments. The monitoring gateway 118 may be configured to connect with an external system (e.g., external monitoring system 124) to provide communication between the remediation module 110 on primary node 106 (or remediation module 112 on secondary node 108). The monitoring gateway 118 may expose an application programming interface (API) for sending and receiving requests (e.g., RESTful calls) from the remediation module 110 (or remediation module 112) to external system (e.g., external monitoring system 124). For example, remediation module 110 may send an approval request to external monitoring system 124 to approve an automated remediation task for one of the service(s) 116. The external monitoring system 124 may send an approval back to remediation module 110 via monitoring gateway 118.

In some embodiments, the distributed computing system 104 may connect to the external system via one or more network(s) 126. The external system may associated with a provider 120, which can be a cloud services provider deploying and supporting service(s) 116 and other cloud computing infrastructure in the distributed computing system 104. The network(s) 126 may be one or more networks (e.g., public networks, private networks, the Internet) suitable for connecting the distributed computing system 104 with an external computing system.

The provider 120 may implement the external monitoring system 124 in any suitable computing environment, including a public cloud environment or other distributed computing environment. The external monitoring system 124 may be configured to provide external monitoring functionality for service(s) 116 deployed in the distributed computing system 104. For example, the external monitoring system 124 may queue remediation requests that need approval (e.g., approval from operations personnel) and/or queue remediation tasks initiated from the provider's 120 system (e.g., software patching). As another example, the external monitoring system 124 may receive alarms, alerts, or other similar indications from remediation module 110 and present the alarms and alerts to personnel (e.g., at display device or other monitoring console). Similarly, the external monitoring system 124 may query the monitoring status of remediation module 110 to obtain health metrics or similar state information about the service(s) 116 deployed in the distributed computing system 104.

Figure 2:
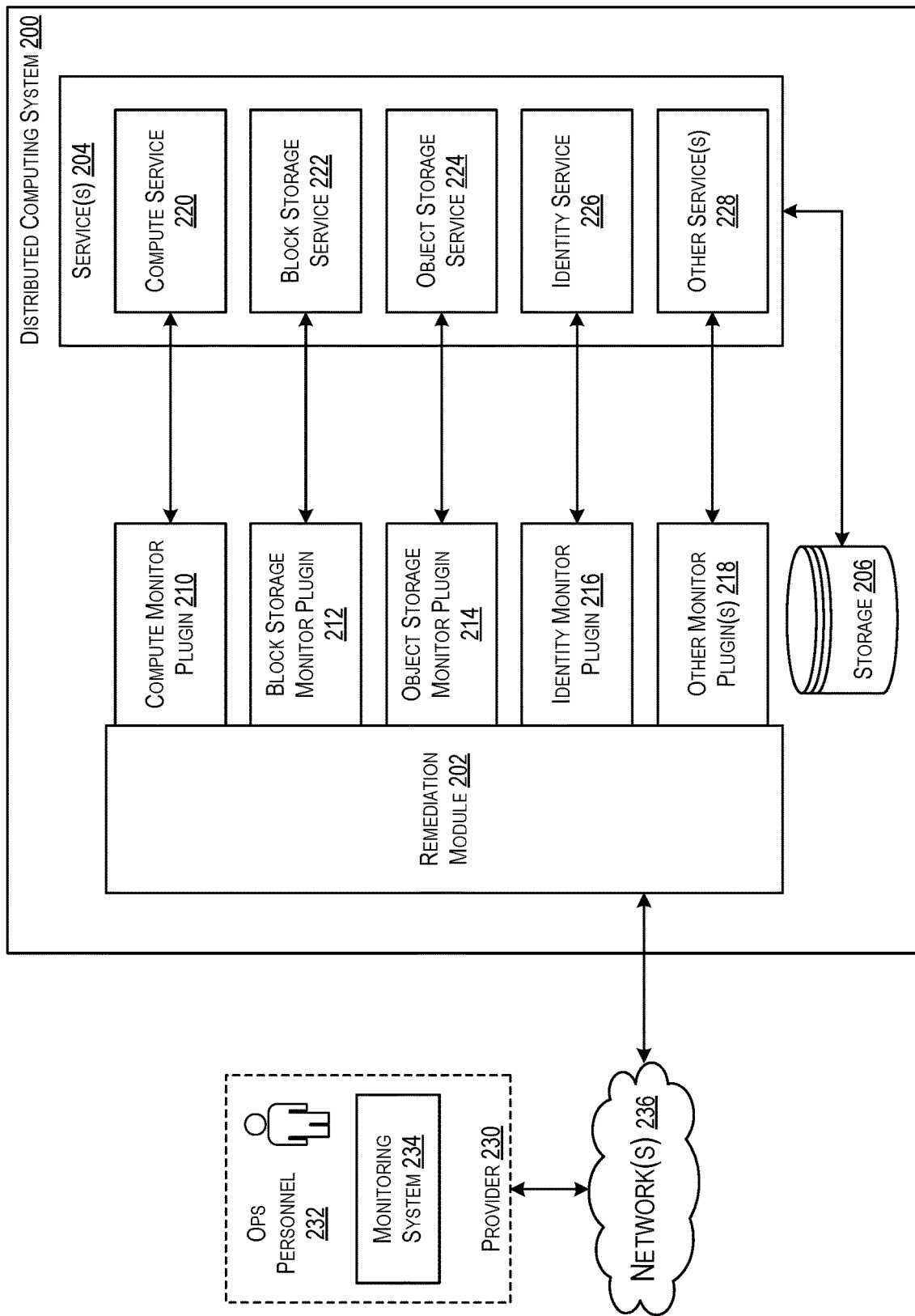
FIG. 2 depicts a distributed computing system that includes a remediation module to monitor the health of a plurality of services hosted within the distributed computing system, according to some embodiments.

FIG. 2 depicts a distributed computing system 200 that includes a remediation module 202 to monitor the health of a plurality of service(s) 204 hosted within the distributed computing system, according to some embodiments. The distributed computing system 200 may be an example of distributed computing system 104 of FIG. 1. Similarly, remediation module 202 and service(s) 204 may be examples of remediation module 110 and service(s) 116 of FIG. 1, respectively. The distributed computing system 200 may communicate with an external monitoring system (e.g., monitoring system 234), which may be managed by a cloud services provider (e.g., provider 230) in conjunction with provider personnel (e.g., operations personnel 232). The communication with the external systems may be done over network(s) 236 (an example of network(s) 126 of FIG. 1). These external systems may be similar to provider 120 and external monitoring system 124 of FIG. 1.

The service(s) 204 hosted within the distributed computing system 200 can include a compute service 220, block storage service 222, object storage service 224, identity service 226, and one or more other service(s) 228. For example, compute service 220 may provide computing instances to handle data operations within the distributed computing system 200, including other service(s) 204. Block storage service 222 may be configured to store data as blocks, potentially in a distributed manner (e.g., across multiple storage devices), while object storage service 224 may be configured to provide object storage (including metadata storage) within the distributed computing system, potentially in conjunction with one or more storage devices (e.g., storage 206). Identity service 226 may provide identity and access management functionality (e.g., user account management, user groups, single sign-on), while other service(s) 228 can include workflow services, credential store services, or other services. The distributed computing system 200 may be configured to provide any suitable number of services.

As described briefly above, service(s) 204 may depend on one another to provide the service functionality. For example, compute service 220 may use block storage service 222 to retrieve and persist (e.g., store) data used, modified, and/or generated with the compute operations. Thus, compute service 220 may be said to depend on block storage service 222, or, said another way, block storage service 222 is a dependency of compute service 220 or an "upstream" service. Depending on the scope of the functionality of each service of service(s) 204, the dependencies may be complicated. For example, the identity service 226 may depend on a credential storage service, which may in turn depend on object storage service 224 or block storage service 222. In addition, remediation module 202 may itself use service(s) 204 (e.g., identity service 226) to perform operations related to monitoring (e.g., obtain credentials to login to a host)

The remediation module 202 may be configured to monitor the service(s) 204 and provide automated remediation (e.g., perform one or more remediation tasks) for the service(s) 204. As used herein, the term "remediation" may refer to operations related to restoring functionality to a service or service component (e.g., restarting a service) and/or operations to provide indications of the health status or remediation state of the service(s) (e.g., send alerts, alarms, generate help tickets, etc.). To provide monitoring and remediation to the service(s), the remediation module 202 can load one or more monitor plugins, including compute monitor plugin 210, block storage monitor plugin 212, object storage monitor plugins 214, identity monitor plugin 216, and one or more other monitor plugin(s) 218. The number of plugin monitors may suitable to correspond to any number of service(s) 204 provided by the distributed computing system 200, and may, in some instances, be greater or fewer than the number of service(s) 204 depending on the configuration of the distributed computing system 200 and the remediation module 202. A plugin may be a lightweight piece of code or software that can be loaded by (e.g., executed in conjunction with) another application or executing software (e.g., remediation module 202). The plugins may provide an interface to communicate with service(s) 204. The monitor plugins described herein may be referred to simply as "monitors," for brevity.

As depicted in FIG. 2, each monitor can correspond to one of service(s) 204. For example, compute monitor plugin 210 corresponds to compute service 220, and so on for the other monitors. The monitors may be configured according to the configuration of the corresponding service. For example, compute monitor plugin 210 may be configured with dependency information that specifies the dependencies of compute service 220 (e.g., depends on block storage service 222). The dependency information may also specify dependencies on one or more components of the corresponding service. For example, compute service 220 may only need one instance (e.g., available host) of block storage service 222 to function. When performing a dependency check for compute service 220, remediation module 202 may consider block storage service 222 to be "healthy" if it can access at least one instance of block storage service 222.

Additionally, in some embodiments, the monitors can include information specifying how to interface with the corresponding service. The information can include operations to perform to query the corresponding service's health (e.g., obtain health metrics). For example, a monitor plugin may specify the names of target hosts hosting a service, the location of a script or other code or program to execute to query the target hosts, locations to store or persist the queried health metric, a command (e.g., a command line interface command) usable to execute script or other code or program at the target hosts, locations of credentials to access the target hosts, and the configuration of ports or other interfaces through which the monitor plugin (and by extension, the remediation module 202) can access the target hosts for the service.

As a particular example of the above, an identity messaging service may be included as one of the other service(s) 228 and may be configured to providing notifications to a messaging queue for consumption by other services (e.g., notifications associated with identity service 226). An identity messaging service plugin (e.g., one of the other monitor plugin(s) 218) may specify that the identity messaging service depends on identity service 226 and requires all hosts of identity service 226 to be healthy as part of the dependency. The identity messaging monitor plugin may also specify the location of a script (e.g., a shell script) configured to check the health of the identity messaging service.

In addition to specifying dependencies, the monitors may also specify the remediation operations to execute in response to obtaining certain health metrics from the service. Each monitor may include one or more remediation tasks corresponding to particular states of the corresponding service. For example, a monitor plugin may specify a trigger for performing the remediation, a command to execute the remediation (e.g., a command line interface command), the location and names of configuration files (e.g., YAML files, JSON files, etc.) or other configuration data used to execute the command, and whether the remediation is to be performed automatically or with approval (e.g., approval from operations personnel 232). The trigger may be related to a health metric obtained by the remediation module 202.

In some embodiments, the remediation module 202 may be configured to generate a dependency tree based on the dependency information contained in all the monitors loaded by the remediation module 202. A specific example of a dependency tree is illustrated below in FIG. 3. The dependency tree may identify each dependency of the service(s) 204 monitored using monitor plugins (e.g., monitor plugins 210-218), including chains of dependencies and multiple dependencies. The dependency tree may be stored as data in a configuration file (e.g., JSON file) or other similar structure.

Generating the dependency tree may allow the remediation module 202 to quickly perform dependency health checks for dependent services without a need to determine the dependencies at the time of the check. For example, a service may depend on compute service 220, but may not explicitly depend on block storage service 222. That is to say, the monitor plugin corresponding to the service may only specify the dependency on compute service 220, even though compute service 220 may itself depend on block storage service 222. In this way, the monitors may only specify the direct dependencies of the corresponding service, so that each monitor can be efficiently provisioned without knowing the complete state of the service(s) within the distributed computing system 200. By generating the dependency tree at runtime, the remediation module 202 can determine the dependency structure of all service(s) 204 that it is monitoring. In addition, the remediation module 202 can update the dependency tree anytime a new monitor is loaded or an existing monitor is updated or removed (e.g., corresponding to a new service being deployed or an existing service being modified). Thus, the remediation module 202 can dynamically adjust to changes in the service(s) while executing and without multiple services teams having to coordinate to specify the global configuration service(s) 204 in the distributed computing system 200

In some embodiments, the remediation module 202 may build an inventory of the distributed computing system 200. The inventory may contain information about the hosts (e.g., VMs) within the distributed computing system 200, including which service(s) 204 are hosted by which hosts, addresses (e.g., IP addresses, other network addresses, etc.) of the hosts, host names, group names, user IDs and passwords for accessing the hosts (e.g., via secure shell/SSH), and the like. The inventory may be stored as a configuration file (e.g., a JSON file). The inventory may be built/updated according to a schedule (e.g., every hour). The remediation module 202 may build the inventory by accessing APIs exposed by a control plane of the distributed computing system 200 to obtain information about the configuration of hosts, nodes, VMs, and other devices (e.g., storage devices) within the distributed computing system 200. Because the remediation module 202 can access the inventory, the monitors may only specify a portion of the host configuration for the corresponding service. For example, the compute monitor plugin 210 may only specify a group name for hosts that host compute service 220. Using the inventory, the remediation module 202 can then identify all the hosts for compute service 220 without all of these hosts being specified in the compute monitor plugin 210. Similarly, the remediation module 202 may use the inventory to identify the hosts for services 222-228 without these hosts being specified in the corresponding monitor plugins 212-218. This allows substantial flexibility and granularity in the configuration and deployment of the monitors, and can allow the remediation module 202 to respond seamlessly to dynamic changes in the distributed computing system 200.

Figure 3:
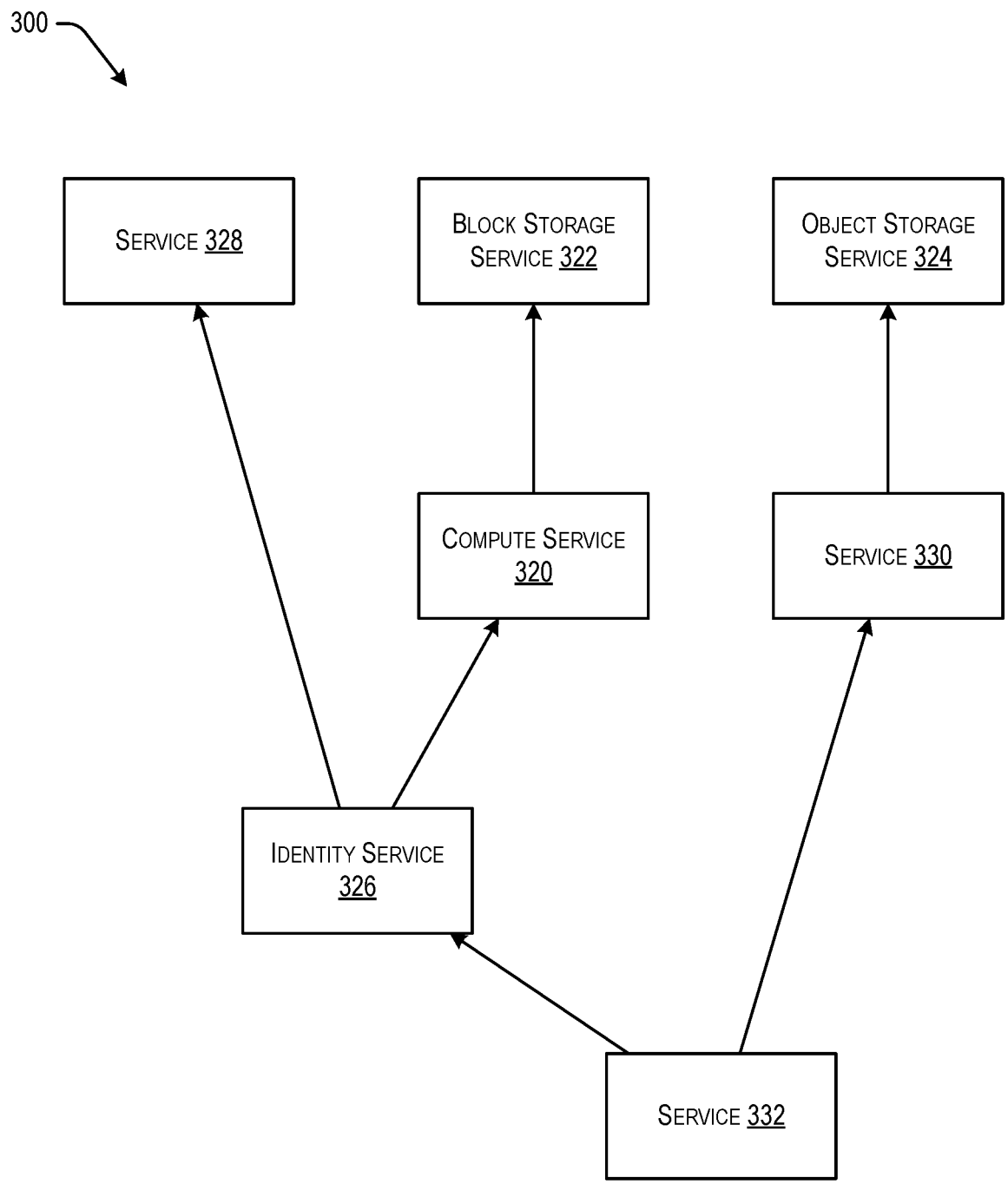
FIG. 3 is a simplified diagram depicting an example dependency tree for services hosted within a distributed computing system, according to some embodiments.

FIG. 3 is a simplified diagram depicting an example dependency tree 300 for services (e.g., service(s) 204 of FIG. 2) hosted within a distributed computing system (distributed computing system 200 of FIG. 2), according to some embodiments. As depicted, the dependency tree can include compute service 320, block storage service 322, object storage service 324, identity service 326, and services 328-332. These services may be examples of services(s) 204 of FIG. 2 (e.g., compute service 320 may be an example of compute service 220, and so on).

As depicted by the arrows, a service may depend on another service to which the arrow points. For example, compute service 320 may depend on block storage service 322. The dependencies may be chained. For example, service 332 may depend on identity service 326, which in turn depends on both service 328, compute service 320, and block storage service 322. The dependencies may also be multiple. Service 332 can also depend on service 330 (and subsequently object storage service 324).

Depending on the configuration of the service, upstream dependencies that are not directly adjacent in the dependency tree 300 may not be identified as an explicit dependency of the service (e.g., may not be identified in a corresponding monitor plugin). For example, a monitor plugin corresponding to service 332 may specify the dependency on identity service 326 and service 330, but may not specify the dependency on service 328. However, a remediation module (e.g., remediation module 202 of FIG. 2) may generate the complete dependency tree 300 using dependency information from each loaded monitor plugin. In this way, the remediation module can identify all upstream dependencies of a service when performing health checks and/or remediation tasks.

Additionally, the dependencies for dependency tree 300 may also correspond to components of the services. For example, service 332 may depend on components of identity service 326. For example, service 332 may require at least one host (e.g., one instance) of identity service 326 to be available, rather than all hosts of identity service 326. This "soft-dependency" may be specified in the dependency information of the corresponding monitor plugin for service 332.

By mapping the dependency structure to a dependency tree 300, a remediation module (e.g., remediation module 202) may be able to efficiently and intelligently perform health checks on the services and initiate remediation tasks. For example, if the remediation module detects that service 332 is unhealthy (e.g., by receiving a health metric corresponding to an unhealthy state), then the remediation module can use dependency tree 300 to perform health checks on identity service 326, service 328, compute service 320, block storage service 322, service 330, and object storage service 324 to obtain health metrics for each. The remediation module may initiate remediation for service 332 only if all the dependency services are healthy. If one of the dependency service (e.g., compute service 320) is unhealthy, the remediation module may store the health metric for service 332 and take no remediation action for compute service 320. Instead, the remediation module may remediate compute service 320 first, then recheck the health of service 332. If service 332 is still unhealthy, then the remediation module may initiate remediation according to the specification of the corresponding monitor plugin.

The dependency tree 300 depicted in FIG. 3 is one example of the dependency structure of services in a distributed computing system. Other dependencies are possible in accordance with various configurations and number of services, hosts, and other computing resources and components in the system.

FIG. 4 is a snippet 400 of code representing health metrics 402 of services (e.g., service(s) 204 of FIG. 2) monitored by a remediation module (e.g., remediation module 202 of FIG. 2), according to some embodiments. The health metrics 402 may be obtained by the remediation module during a health check or similar operation on a service. The health metrics 402 and persisted in a data store (e.g., as a file in a file storage). The health metrics may be obtained by the remediation module from the service by performing a health check operation (e.g., via a script or command) specified in a monitor plugin corresponding to the service.

The health metrics 402 may correspond to various states of the services, including, but not limited to, whether the remediation module has checked the health of all the dependency services and/or components for a given service, whether any dependency services and/or components have a health metric indicating an "unhealthy" state, whether the service reports that it needs manual remediation, whether the service has completed an automatic remediation process but has not yet had its health checked, whether automated remediation approval has been requested (e.g., via a request to an external monitoring system 234, whether automated remediation is in progress (e.g., the service is being patched), and whether a component of the service reports its health as unhealthy (e.g., a physical storage device for a storage service reporting a disk failure). As shown in FIG. 4, the health metrics can include a human-readable label describing the state, and a metric value 404.

The metric value 404 may serve to identify the state numerically and may be used as a triggering value to take further action. For example, the metric value 404 may be used to identify and initiate a manual remediation. The manual remediation metric "20" may be sent to an external system (e.g., monitoring system 234, an operations console, etc.), where it may be used to provide an alert or generate a ticket for the manual remediation. Similarly, the metric value 404 may be used to generate alerts or other indications for monitoring the overall health of services in a distributed computing system. For example, operations personnel may query the health metrics for services in the distributed computing system. The remediation module may report the health metrics corresponding to the query, which may be used to populate a dashboard or other console tool for representing health states of computing services (e.g., a Grafana dashboard).

Figure 5:
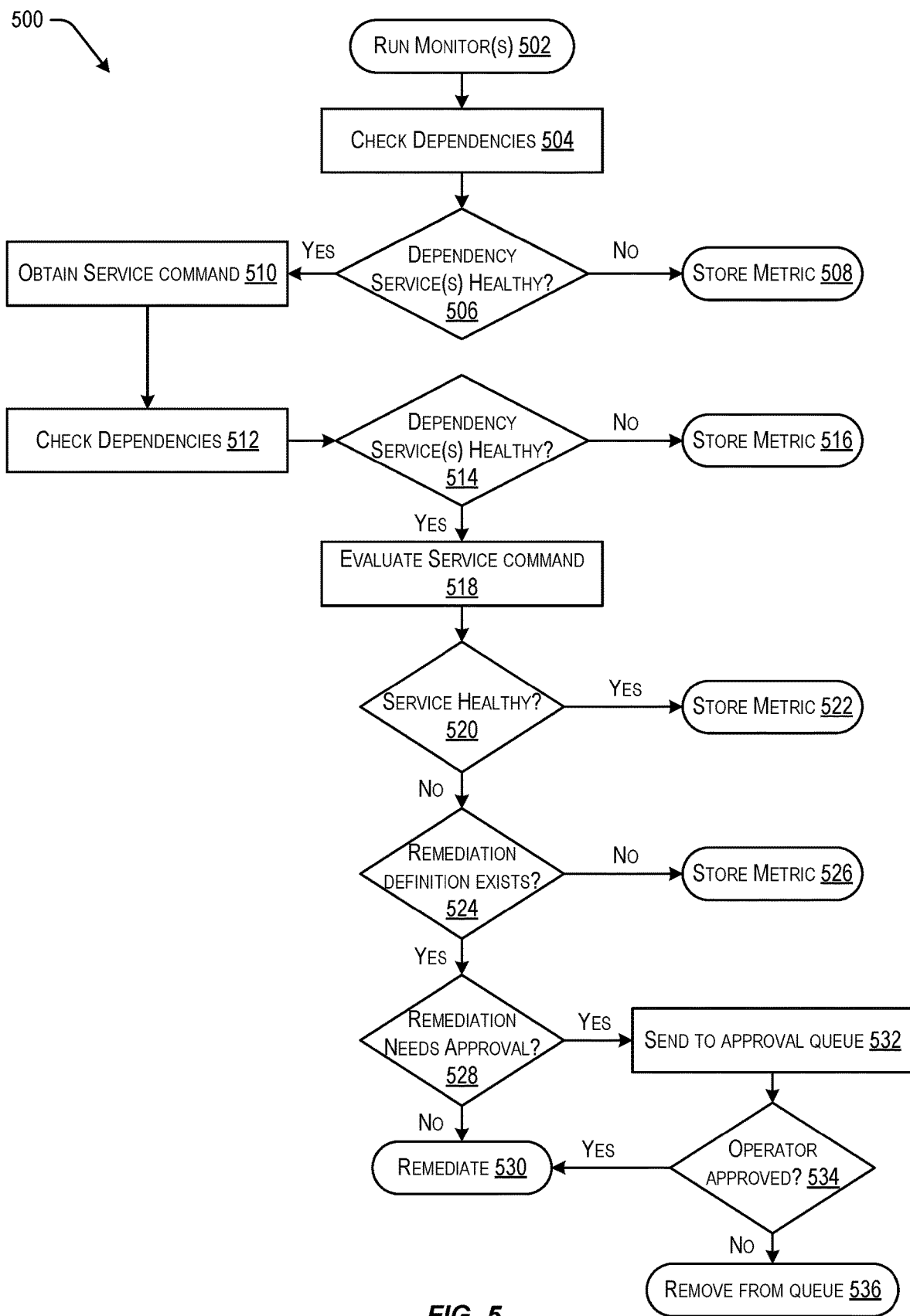
FIG. 5 is a flow diagram of an example process for checking dependencies of a service to determine when to perform remediation, according to some embodiments.

FIG. 5 is a flow diagram of an example process 500 for checking dependencies of a service to determine when to perform remediation, according to some embodiments. The process 500 may be performed by a distributed computing system (e.g., distributed computing system 200 of FIG. 2) that can execute an remediation module (e.g., remediation module 202 of FIG. 2) and one or more monitor plugins (e.g., monitor plugins 210-218 of FIG. 2). The dependencies may be checked by the remediation module. The remediation module may load the monitor plugins, each of which can correspond to a service (e.g., service(s) 204 of FIG. 2) executing in the distributed computing system. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 500 may begin at block 502, when the distributed computing system runs the monitors. Running the monitors may include executing the monitors in conjunction with the remediation module. As plugins, the monitors may provide functionality to the remediation module that can allow the remediation module to interface with the service that corresponds to the particular monitor. For example, a monitor plugin may be configured to allow the remediation module to interact with a service via a secure shell (SSH). The remediation module may then interface with a host of the service via a terminal and execute commands (e.g., run scripts or other programs at the host of the service). Running the monitors may allow the remediation module to access configuration information about dependencies of the services that is contained in the monitors, as well as information specifying operations to check service health and operations to perform remediation tasks.

At block 504, before checking a service health and/or running any command, the remediation module can check any dependencies that the service may have. The remediation module can use a dependency tree (e.g., dependency tree 300 of FIG. 3) that it generates for all services that it monitors. The dependency tree may allow the remediation module to obtain health metrics for all services that are dependencies of the given service. If any dependency is unhealthy, commands for checking the health of the service may not be executed.

A service may be in an unhealthy state because a dependency service is reporting an unhealthy state. That is to say, the service may otherwise function correctly but for its need for functionality from the dependency service. Thus, remediation tasks for the service may have no effect on the service and can leave the state of the distributed computing system unchanged, while causing delays and unneeded expenditures of computing resources. To avoid these issues, the remediation module can check the health of all dependencies identified for the service. Checking the health of the dependency services can include retrieving a stored health metric corresponding to the dependency services. The dependency services' health metrics may be determined by a separate application of process 500 for those dependency services.

At decision 506, if the dependency service(s) are unhealthy, then the remediation module may store the health metric for the target service, at end point 508. This health metric can indicate that the target service has unhealthy dependencies. This health metric can also indicate that the target service health has not been evaluated due to the unhealthy dependencies (since commands for checking the health of the service may not be executed). Since an upstream service is unhealthy, remediation on the service may not restore the health of the service. Thus, process 500 may end without additional action by the remediation module with respect to the service. The remediation module may instead perform process 500 with respect to one or more of the dependency services, particularly the dependency service at the top level of the dependency tree. Doing so may allow the remediation module to quickly identify "root cause" unhealthy services before attempting remediation on other services that indicate unhealthy states.

If the dependency service(s) are healthy, the remediation module may obtain one or more service commands for evaluating the health of the service, at block 510. As described briefly above, evaluating the health of the services may require connecting to a host (since the node needs to be up to be evaluated) and/or executing one or more commands (or scripts, etc.) at the host. The service commands obtained may be specified in the monitor plugin for the corresponding target service.

At block 512, the dependencies for the remediation may be checked before proceeding with evaluating the service commands at the target service. To remediate a service (e.g., restarting the service, restarting a service component, patching the service, etc.), the service may have different dependencies than for checking the service's health. For example, a remediation task may depend on a service of the distributed computing system (e.g., patching a service may require a data storage service to be available to update metadata after the patch), while checking a service's health may depend on a different service (e.g., checking a service on a VM may require that a hypervisor be available). If the dependency services needed for remediation are unhealthy, then the health metric for the target service may be stored (decision 514 and end point 516). The remediation module then may not proceed with the remaining operations of process 500.

In some embodiments, the dependency information for the given service may indicate that the service may only depend on the presence of at least one running instance of the service host, rather than the dependency service being completely healthy. In these embodiments, the check dependencies operation of blocks 504 and 512 may include verifying, by the remediation module, that at least one instance of the dependency service is running (e.g., by communicating with or accessing at least one host specified in the dependency information).

At block 518, the health of the service can be checked by evaluating any commands or scripts results obtained at block 510. The health may be represented by a health metric (e.g., health metrics 402 of FIG. 4). The remediation module may obtain the health metric by executing a command at a host of the service. For example, the remediation module may use information in the corresponding monitor plugin for the service to run an SSH terminal to the host and execute a health check script at the host. In response to the script, the host may return the health metric for the service. In some embodiments, the host may store the health metric in a location (e.g., a directory of a file system, another storage provided by a storage service, etc.) specified by the monitor plugin and provide to the host by the remediation module via the interface. In other embodiments, the remediation module receives the health metric from the host. Depending on the configuration of the service, the remediation module may check the health of each host for a service, or for each component of the service (e.g., storage devices, etc.). In several embodiments, obtain service health may be performed on a schedule at intervals specified in the configuration of the monitor plugin.

At decision 520, the remediation module can evaluate the health of the service. As described above in FIG. 3, the health metric may correspond to one of several health states of the service or its components. In general, only a fully healthy state is regarded as "healthy" for the purposes of decision 520. All other states may indicate various levels of component degradation, service degradation, or service dependence on an unhealthy service. If the service is healthy (e.g., the remediation module obtains a health metric corresponding to the fully healthy state), then the remediation module may store the metric, at end point 522. Because the component is healthy, no further action may be needed from the remediation module.

If the service is unhealthy, process 500 may move to decision 524 and determine if a remediation definition exists. A remediation definition may specify one or more operations to perform to remediate the service. For example, the remediation definition can specify that the service is to be restarted. The remediation definition may specify different operations for different health states of the service (e.g., restart the service if the health state of the service is completely degraded or restart a component of the service if the health state of the service indicates that only the component is degraded). If no remediation definition exists, the remediation module may store the health metrics, at end point 526. Storing the health metrics can include sending the health metrics to an external system (e.g., monitoring system 234 of FIG. 2). In some embodiments, the remediation module can also automatically generate a service ticket (e.g., a Jira ticket), which may be automatically closed after the remediation module completes the remediation process (at end point 530).

If a remediation is defined at decision 524, then process 500 may move to decision 528 where the remediation module can determine whether the remediation for the service needs approval. Both automated and manual remediation operations may require approval. Manual remediation may include an operator or other personnel performing one or more of the remediation tasks (e.g., replacing physical hardware at a customer data center, configuring and provisioning specific computing resources in the distributed computing environment, manually configuring a software patch or fix for the service, etc.). If the remediation requires approval and/or is a manual remediation (or includes a manual remediation task as part of the remediation process), the remediation module may send an alert or other indication (e.g., send an indication to an external monitoring service) that approval is needed and/or identifying the manual remediation task indicated by the service. In some embodiments, the external monitoring system may generate a help ticket (e.g., a Jira ticket) based on the indication sent from the remediation module. Sending the alert or indication at block 532 may be a remediation task for the remediation module to perform.

Approval for a remediation task may be requested from an external monitoring system (e.g., monitoring system 234 of FIG. 2). The request may be queued at the monitoring system, at block 532. Approval of the request may be provided by personnel (e.g., operations personnel 232 of FIG. 2). Whether a remediation tasks needs approval may be specified in the monitor plugin corresponding to the service. For example, a newly developed service may be deployed into the distributed computing system. Because the new service may be expected to fail during testing and initial deployment, the corresponding monitor plugin may be configured to require approval for remediation tasks for the newly developed service in order to prevent the remediation module from implementing automatic remediation. Doing so can avoid the remediation module and the external monitoring system from expending resources to remediate the new service during testing on its initial deployment, since the service was expected to fail.

If the remediation task needs approval, and approval is subsequently received at decision 534 (e.g., from the external monitoring system) or if the remediation did not need approval at decision 528, the remediation module may perform one or more remediation tasks for the service, at end point 530. The remediation tasks can include executing a command defined in the monitor plugin for the service. For example, the monitor plugin may identify a script and a command to run the script at one or more hosts of the service. The remediation module may interface with the one or more hosts to execute the command (e.g., via SSH). In some embodiments, the remediation task can include sending an alert, alarm, or other indication regarding the state of the service. If the remediation task required approval and approval was not received (at decision 534), the request may be removed from the queue, at end point 536.

Figure 6:
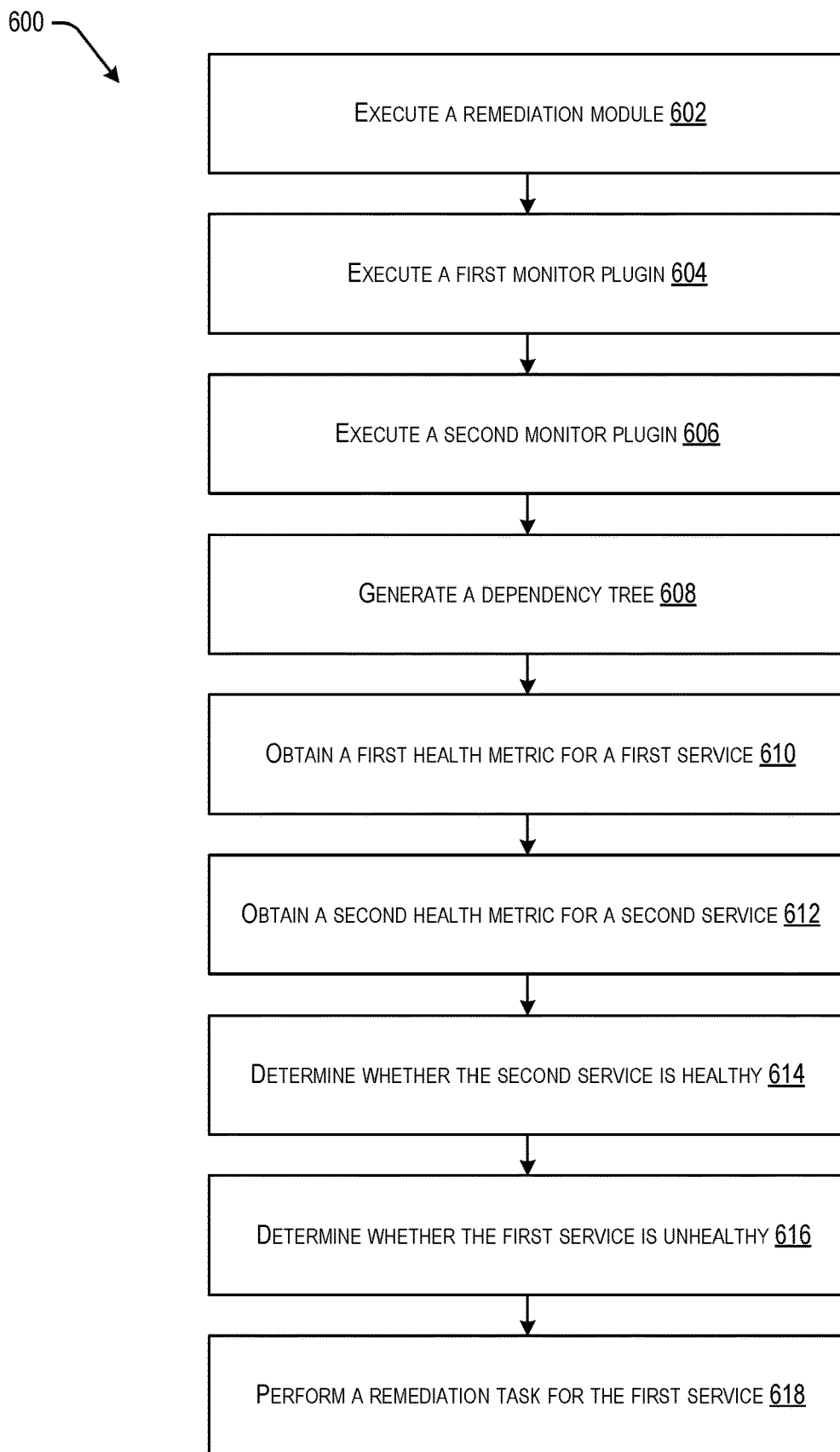
FIG. 6 is a simplified flow diagram of an example process for monitoring the health of a first service and performing a remediation task for the first service after determining that a second service is healthy, according to some embodiments.

FIG. 6 is a simplified flow diagram of an example process 600 for monitoring the health of a first service and performing a remediation task for the first service after determining that a second service is healthy, according to some embodiments. The health monitoring may be performed by a distributed computing system (e.g., distributed computing system 200 of FIG. 2). Some operations of process 600 may be similar to one or more operations of process 500 of FIG. 5.

Process 600 may begin at block 602, where the distributed computing service can execute a remediation module. The remediation module may similar to other remediation modules described herein, including remediation module 202 of FIG. 2 or remediation modules 110 and 112 of FIG. 1. The remediation module may be a container (e.g., a Docker container) executed on a host (e.g., a primary node of the distributed computing system, primary node 106 of FIG. 1). The distributed computing system may execute a secondary instance of the remediation module as a second container on a second node (e.g., a secondary node of the distributed computing system, secondary node 108 of FIG. 1) to provide redundancy and high availability of the monitoring service provided by the remediation module.

At block 604, the distributed computing system may execute a first monitor plugin. Executing the first monitor plugin can include loading the first monitor plugin into the remediation module or otherwise executing the first monitor plugin in conjunction with the remediation module. The first monitor plugin may be configured to interface with the remediation module (e.g., by connecting with a plugin interface of the remediation module). The first monitor plugin may correspond to a first service hosted by the distributed computing system and can include configuration information about the first service. For example, the first monitor plugin can include dependency information for the first service. The first monitor plugin can also specify one or more remediation tasks to perform for the service, as well as specify operations to perform a health check on the first service.

Similarly, at block 606, the distributed computing system can execute a second monitor plugin. The second monitor plugin can correspond to a second service hosted within the distributed computing system. The second monitor plugin may also be configured to interface with the remediation module.

At block 608, the remediation module may generate a dependency tree (e.g., dependency tree 300). The remediation module may use the dependency information included in the first monitor plugin, as well as other dependency information included in the second monitor plugin or other monitor plugins loaded into the remediation module and/or executing by the distributed computing system. The dependency tree may be stored as a configuration file (e.g., JSON file). The dependencies specified by the dependency tree can include service-level dependencies (e.g., one service depends on another service) as well as component-level dependencies (e.g., one service depends on a component of another service) or other similar combinations. The dependency tree can specify the dependencies of all services monitored by the DM.

In some embodiments, the remediation module can update the dependency tree in response to new or updated monitor plugins being loaded in, corresponding to new or modified services deployed in the distributed computing environment. For example, the distributed computing system can execute a third monitor plugin corresponding to a newly deployed third service hosted in the distributed computing system. When the third monitor plugin is loaded into the remediation module, the remediation module can generate an updated dependency tree based on additional dependency information included in the third monitor plugin.

At blocks 610 and 612, the remediation module can obtain a first health metric for the first service and a second health metric for the second service. As described above, obtaining a health metric can include performing operations at a host of the service (e.g., executing a command or script) to receive the health metric. In some embodiments, the remediation module can generate a system inventory specifying the configuration of one or more hosts that execute the services, including the first service and the second service. The remediation module can use the system inventory to identify one or more hosts of the first service and then establish a connection with the hosts. The remediation module may use the connection to execute the commands, scripts, or other operations at the host that are specified in the first monitor plugin for performing the health check on the first service. In some embodiments, the remediation module can update the system inventory in response to identifying a change to the configuration of the hosts (e.g., additional hosts provisioned for the service, hosts deprovisioned for the service, etc.). In some other embodiments, the system inventory may be updated according to a schedule (e.g., every hour).

The first monitor plugin may specify a first interval for obtaining the first health metric from the first service. Similarly, the second monitor plugin may specify a second interval for obtaining the second health metric from the second service. The first interval and the second interval may be different, so that the operations of blocks 610 and 612 may occur in the order depicted or in a different order or simultaneously. In some embodiments, the remediation module obtains the second health metric after receiving the first health metric and in response to determining that the first service is unhealthy (e.g., the operations described below with respect to block 614).

At block 614, the remediation module can determine whether the second service is healthy. The remediation module may use the dependency tree generated at block 608 to identify that the first service depends on the second service. More generally, the remediation module may use the dependency tree to identify any or all of the services on which the first service depends, obtain health metrics for those services, and then determine whether those services are healthy. Whether the second service is healthy may depend on the second health metric. The second health metric can correspond to a state of the second service, including whether the service is currently undergoing remediation, whether the service has dependency services that are unhealthy, whether a component of the service is degrade, and the like. An unhealthy state of the service may be any state other than the full health state. If the second service is unhealthy, then the remediation module may store remediation information that includes the first health metric, the second health metric, and/or the dependency of the first service on the second service.

If the remediation module determines that the second service is healthy, then the remediation module may determine whether the first service is unhealthy, at block 616. The health of the first service can be based on the first health metric obtained by the remediation module. The first health metric can correspond to a state of the first service, and may include similar information as the second health metric.

Finally, at block 618, if the remediation module determines that the first service is unhealthy (e.g., the first health metric indicates any other state than the fully healthy state), then the remediation module can perform a remediation task for the first service. The remediation task can include generating an alert that includes the first health metric or related information (e.g., the health metric value). The remediation module may send the alert to a monitoring system (e.g., monitoring system 234 of FIG. 2, an operator console, a user device, another computing device, etc.). The remediation task may be restarting the first service. The remediation task may also include updating the first service according to a patch. The patch or other update can be provided by the external monitoring system or other system used to deploy software fixes and updates to the distributed computing system. In some embodiments, the remediation task can also include sending an approval request to a monitoring system, receiving an indication that the approval request was approved, and then performing the remediation task (e.g., restarting the service, provisioning additional computing resources for the service, etc.).

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware and databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 7:
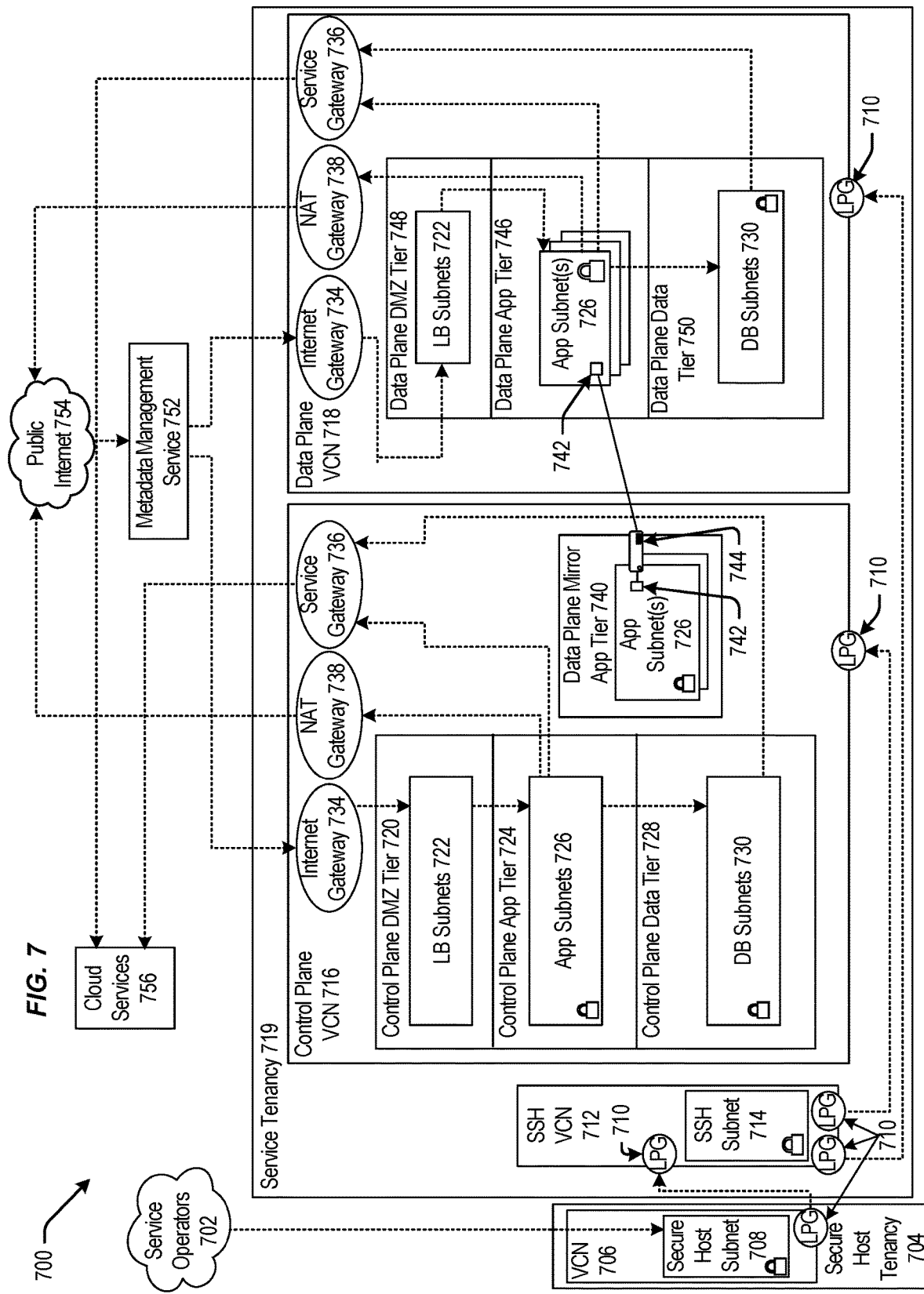
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBeny 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
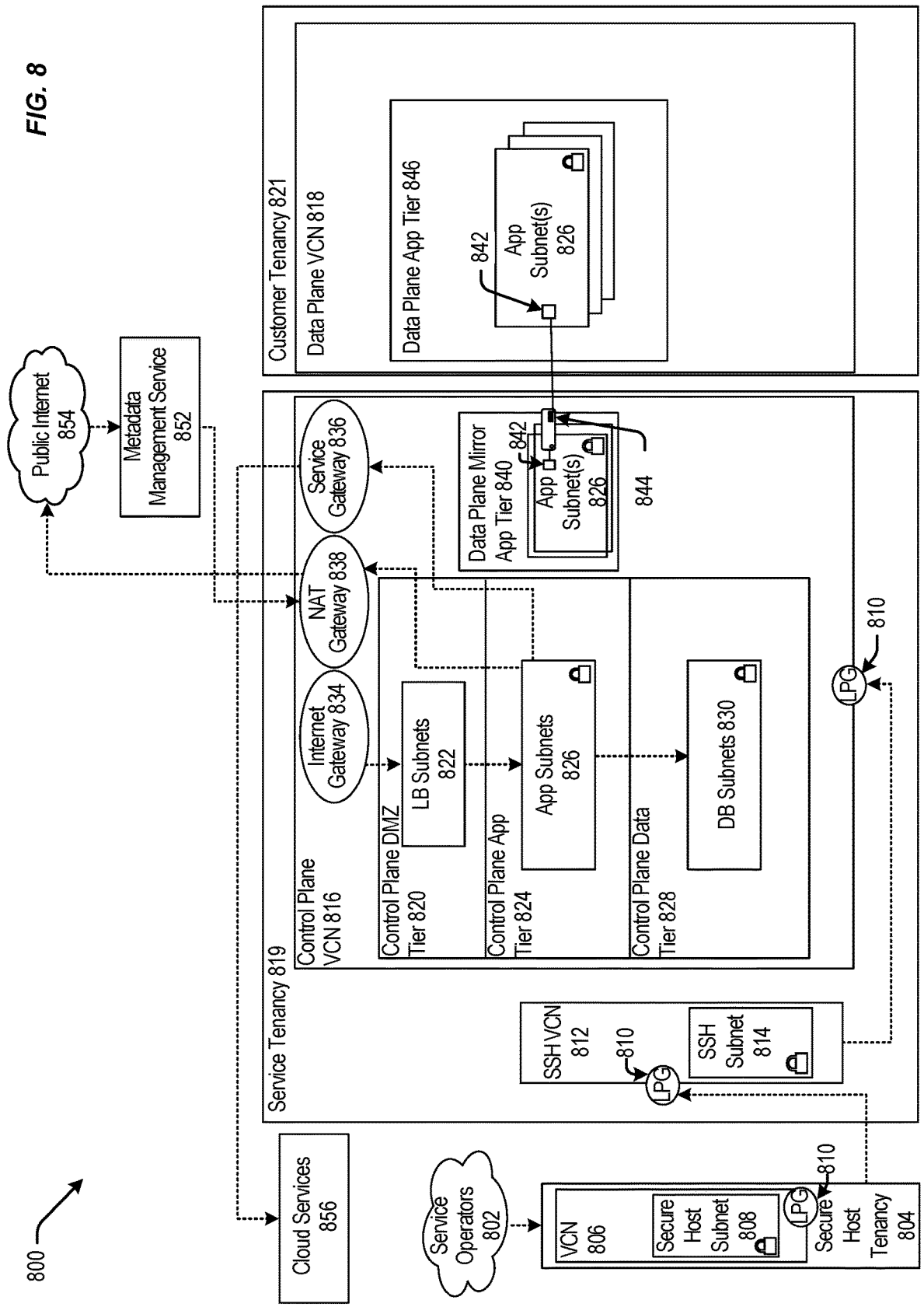
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
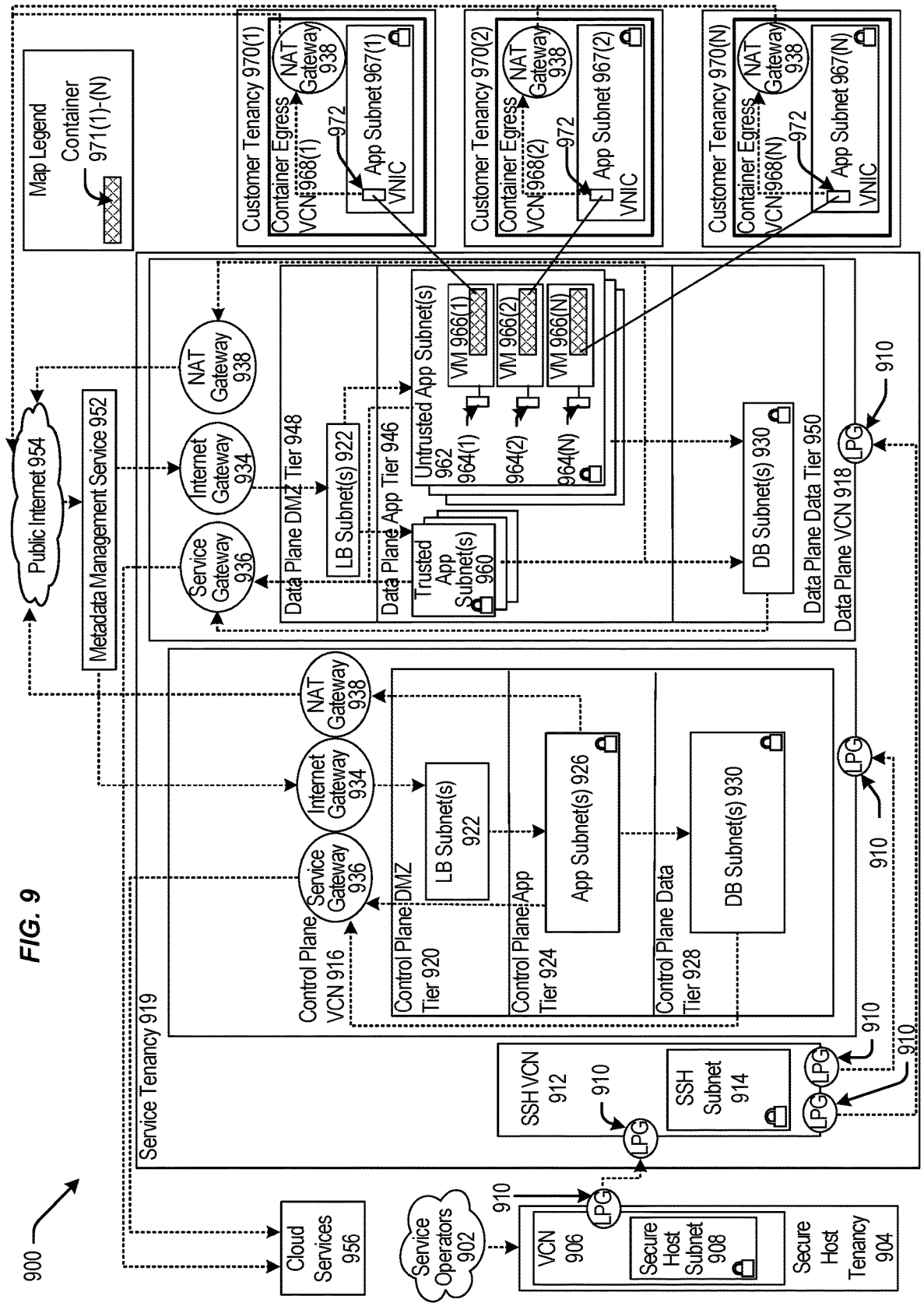
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e g similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
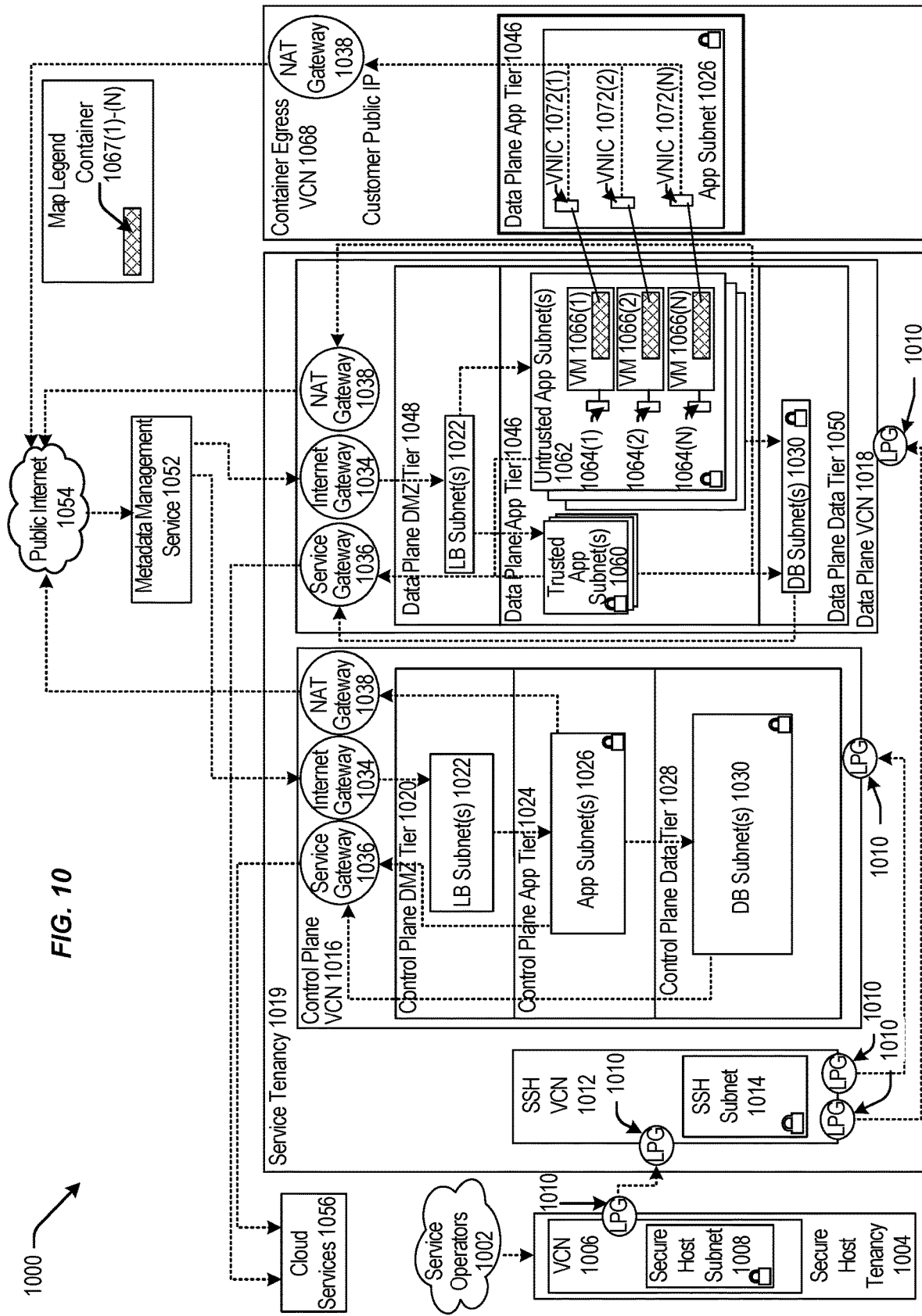
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) cantransmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
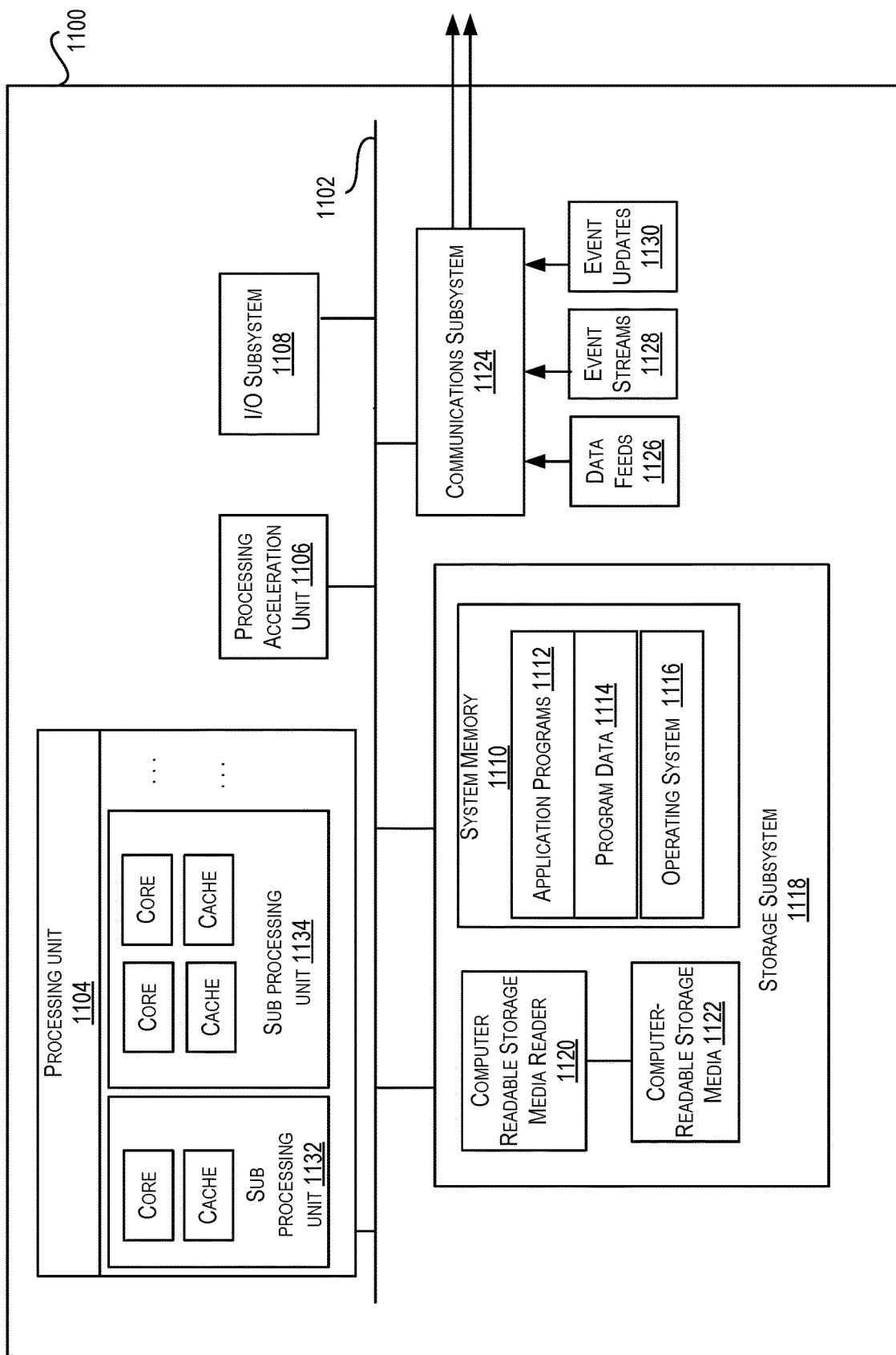
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method implemented by a distributed computing system, the method comprising:

executing a remediation service;

executing a first monitor plugin configured to interface with the remediation service and corresponding to a first service hosted by the distributed computing system, the first monitor plugin comprising dependency information for the first service;

executing a second monitor plugin configured to interface with the remediation service and corresponding to a second service hosted by the distributed computing system;

generating, by the remediation service and based at least in part on the dependency information, a dependency tree specifying a dependency of the first service on the second service;

obtaining, by the remediation service via the first monitor plugin, a first health metric of the first service;

obtaining, by the remediation service via the second monitor plugin, a second health metric of the second service;

determining, by the remediation service and based at least in part on the dependency tree and the second health metric, whether the second service is healthy;

in accordance with a determination that the second service is healthy, determining, by the remediation service and based at least in part on the first health metric, whether the first service is unhealthy; and in accordance with an additional determination that the first service is unhealthy, performing, by the remediation service, a remediation task for the first service.

2. The method of claim 1, further comprising:

executing a third monitor plugin configured to interface with the remediation service, the third monitor plugin corresponding to a third service hosted by the distributed computing system, the third monitor plugin comprising additional dependency information of the third service; and generating, by the remediation service and based at least in part on the additional dependency information, an updated dependency tree specifying the dependency of the first service on the second service and an additional dependency of the third service on the first service.

3. The method of claim 1, further comprising:

in accordance with another determination that the second service is unhealthy, storing, by the remediation service, remediation information comprising the first health metric, the second health metric, and the dependency of the first service on the second service.

4. The method of claim 1, wherein performing the remediation task for the first service comprises:

generating, by the remediation service, an alert comprising the first health metric; and sending the alert to a monitoring system.

5. The method of claim 1, wherein performing the remediation task for the first service comprises:

sending, to a monitoring system, an approval request;

receiving, from the monitoring system, an indication that the approval request was approved; and responsive to the indication, performing the remediation task for the first service.

6. The method of claim 1, wherein performing the remediation task for the first service comprises restarting the first service.

7. The method of claim 1, wherein performing the remediation task for the first service comprises updating the first service according to a patch.

8. The method of claim 1, wherein obtaining the first health metric comprises:

identifying, by the remediation service using a system inventory, one or more hosts executing the first service;

establishing, by the remediation service, a connection with the one or more hosts; and executing, by the remediation service at the one or more hosts via the connection, a command to query the first health metric.

9. The method of claim 8, wherein the system inventory specifies a configuration of the one or more hosts executing the first service, and further comprising:

identifying, by the remediation service according to a schedule, a change to the configuration of the one or more hosts; and updating, by the remediation service, the system inventory.

10. The method of claim 1, wherein the first monitor plugin includes a monitoring interval, and wherein obtaining the first health metric comprises querying the first service according to the monitoring interval.

11. A distributed computing system comprising:

one or more processors; and one or more memories storing computer-executable instructions that, when executed with the one or more processors, cause the distributed computing system to at least:

execute a remediation service;

execute a first monitor plugin configured to interface with the remediation service and corresponding to a first service hosted by the distributed computing system, the first monitor plugin comprising dependency information for the first service;

execute a second monitor plugin configured to interface with the remediation service and corresponding to a second service hosted by the distributed computing system;

generate, by the remediation service and based at least in part on the dependency information, a dependency tree specifying a dependency of the first service on the second service;

obtain, by the remediation service via the first monitor plugin, a first health metric of the first service;

obtain, by the remediation service via the second monitor plugin, a second health metric of the second service;

determine, by the remediation service and based at least in part on the dependency tree and the second health metric, whether the second service is healthy;

in accordance with a determination that the second service is healthy, determine, by the remediation service and based at least in part on the first health metric, whether the first service is unhealthy; and in accordance with an additional determination that the first service is unhealthy, perform, by the remediation service, a remediation task for the first service.

12. The distributed computing system of claim 11, wherein the one or more memories store further instructions that, when executed with the one or more processors, cause the distributed computing system to further:

executing a third monitor plugin configured to interface with the remediation service, the third monitor plugin corresponding to a third service hosted by the distributed computing system, the third monitor plugin comprising additional dependency information of the third service; and generating, by the remediation service and based at least in part on the additional dependency information, an updated dependency tree specifying the dependency of the first service on the second service and an additional dependency of the third service on the first service.

13. The distributed computing system of claim 11, wherein the one or more memories store further instructions that, when executed with the one or more processors, cause the distributed computing system to further:

in accordance with another determination that the second service is unhealthy, storing, by the remediation service, remediation information comprising the first health metric, the second health metric, and the dependency of the first service on the second service.

14. The distributed computing system of claim 11, wherein performing the remediation task for the first service comprises:

generating, by the remediation service, an alert comprising the first health metric; and sending the alert to a monitoring system.

15. The distributed computing system of claim 11, wherein performing the remediation task for the first service comprises:
sending, to a monitoring system, an approval request;
receiving, from the monitoring system, an indication that the approval request was approved; and
responsive to the indication, performing the remediation task for the first service.

16. A non-transitory computer-readable storage medium storing computer-executable instructions that, when executed with one or more processors of a distributed computing system, cause the distributed computing system to perform operations comprising:
executing a remediation service;
executing a first monitor plugin configured to interface with the remediation service and corresponding to a first service hosted by the distributed computing system, the first monitor plugin comprising dependency information for the first service;
executing a second monitor plugin configured to interface with the remediation service and corresponding to a second service hosted by the distributed computing system;
generating, by the remediation service and based at least in part on the dependency information, a dependency tree specifying a dependency of the first service on the second service;
obtaining, by the remediation service via the first monitor plugin, a first health metric of the first service;
obtaining, by the remediation service via the second monitor plugin, a second health metric of the second service;
determining, by the remediation service and based at least in part on the dependency tree and the second health metric, whether the second service is healthy;
in accordance with a determination that the second service is healthy, determining, by the remediation service and based at least in part on the first health metric, whether the first service is unhealthy; and
in accordance with an additional determination that the first service is unhealthy, performing, by the remediation service, a remediation task for the first service.

17. The non-transitory computer-readable storage medium of claim 16 storing additional instructions that, when executed with one or more processors of a distributed computing system, cause the distributed computing system to perform additional operations comprising:
executing a third monitor plugin configured to interface with the remediation service, the third monitor plugin corresponding to a third service hosted by the distributed computing system, the third monitor plugin comprising additional dependency information of the third service; and
generating, by the remediation service and based at least in part on the additional dependency information, an updated dependency tree specifying the dependency of the first service on the second service and an additional dependency of the third service on the first service.

18. The non-transitory computer-readable storage medium of claim 16 storing additional instructions that, when executed with one or more processors of a distributed computing system, cause the distributed computing system to perform additional operations comprising:
in accordance with another determination that the second service is unhealthy, storing, by the remediation service, remediation information comprising the first health metric, the second health metric, and the dependency of the first service on the second service.

19. The non-transitory computer-readable storage medium of claim 16, wherein performing the remediation task for the first service comprises:
generating, by the remediation service, an alert comprising the first health metric; and
sending the alert to a monitoring system.

20. The non-transitory computer-readable storage medium of claim 16, wherein performing the remediation task for the first service comprises:
sending, to a monitoring system, an approval request;
receiving, from the monitoring system, an indication that the approval request was approved; and
responsive to the indication, performing the remediation task for the first service.

* * * * *

UNITED STATES PATENT AND TRADEMARK OFFICE
CERTIFICATE OF CORRECTION

| | |
|---|---|
| PATENT NO. | : 11,630,747 B1 |
| APPLICATION NO. | : 17/561703 |
| DATED | : April 18, 2023 |
| INVENTOR(S) | : Deboy et al. |

It is certified that error appears in the above-identified patent and that said Letters Patent is hereby corrected as shown below:

In the Specification

In Column 8, Line 67, delete "host)" and insert -- host). --, therefor.

In Column 10, Line 53, delete "200" and insert -- 200. --, therefor.

In Column 12, Line 41, delete "234," and insert -- 234), --, therefor.

In Column 19, Line 41, delete "like." and insert -- like). --, therefor.

In Column 20, Lines 37-38, delete "BlackBeny 8," and insert -- BlackBerry 8, --, therefor.

In Column 28, Line 44, delete "cantransmit" and insert -- can transmit --, therefor.

In Column 32, Line 17, delete "evolution)," and insert -- evolution)), --, therefor.

Signed and Sealed this
Thirteenth Day of February, 2024

Katherine Kelly Vidal
*Director of the United States Patent and Trademark Office*